H. A. REYNOLDS.
Velocipede.
2 Sheets—Sheet 1.
No. 80,425.
Patented July 28, 1868.
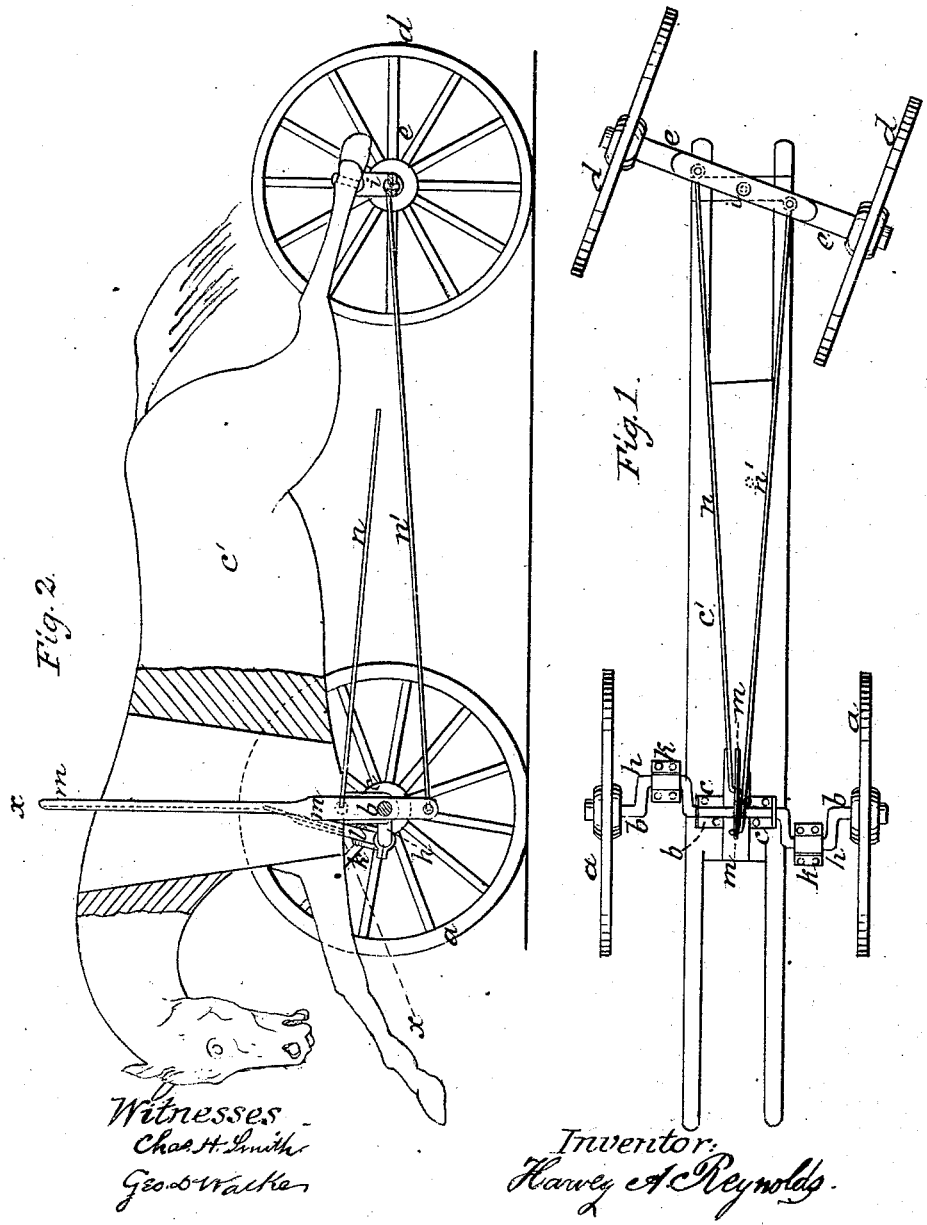

H. A. REYNOLDS.
Velocipede.
2 Sheets—Sheet 2.
No. 80,425.
Patented July 28, 1868.
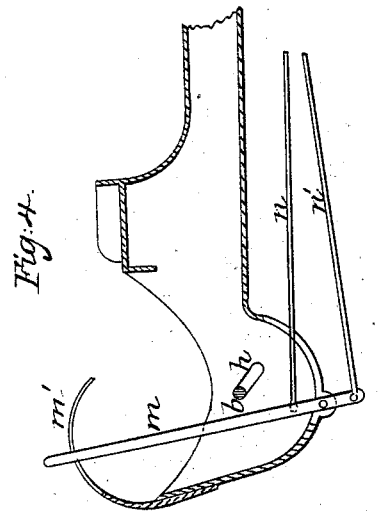
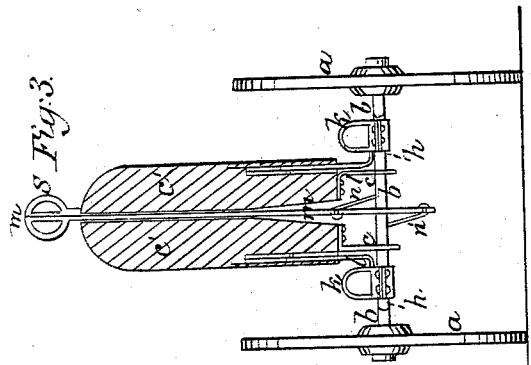
Witnesses
Geo. D. Walker
Cha. H. Smith
Inventor
Harvey A. Reynolds

United States Patent Office.

HARVEY A. REYNOLDS, OF BROOKLYN, NEW YORK.

Letters Patent No. 80,425, dated July 28, 1868.

---

IMPROVEMENT IN VELOCIPEDE.

---

The Schedule referred to in these Letters Patent and making part of the same.

---

TO ALL WHOM IT MAY CONCERN:

Be it known that I, HARVEY A. REYNOLDS, of Brooklyn, E. D., in the county of Kings, and State of New York, have invented, made, and applied to use a certain new and useful Improvement in Velocipedes; and I do hereby declare the following to be a full, clear, and exact description of the said invention, reference being had to the annexed drawing, making part of this specification, wherein—

Figure 1 is an inverted plan of said velocipede.

Figure 2 is a side view, part of the horse that forms the body being in section.

Figure 3 is a cross-section at the line $x\ x$, showing the steering-lever and connections thereof.

Similar marks of reference denote the same parts.

This invention relates to an apparatus for steering the velocipede by the movement of one lever, so that the difficulties heretofore experienced in the use of two levers, one in each hand, may be avoided.

I make use of a body for the velocipede, formed in the shape of a horse or other animal, or with a seat in a box-shaped body, and this is supported on wheels. The front pair are revolved by the feet applied to stirrups and cranks. The back pair of wheels are turned by the action of a lever, that is connected to the axle of said wheels by rods, one of which is attached above the fulcrum of the lever, and the other below, so that when the lever is vertical, the velocipede is adapted to moving in a straight line, and it may be steered either to the right or to the left, by moving said lever forwards or backwards.

In the drawing, $a\ a$ are the front wheels, $b$ the shaft of the same, $c\ c$ the journal-boxes or bearings connecting the shaft $b$ and body $c'$.

$d\ d$ are the hind wheels on the axle $e$, that is connected by the king-bolt $i$ to the body $c'$.

The body $c'$ may be made as a horse, as shown, for the rider to sit on his back, or it may be made in any other form, such as a box containing a seat.

The shaft $b$ is made with two cranks, $h\ h$, at about one hundred and eighty degrees apart, and the wheels $a\ a$ are fastened upon the axle $b$ so as to be revolved by the rotation of said shaft or axle $b$, by the rider's feet acting in the stirrups $k\ k$, that are applied to each of the cranks $h$.

Heretofore it has been usual to have the stirrups below the cranks. I have placed them above the cranks, so that the rider can sit higher, and his feet will be much more free to move, and be less liable to injury than when they come below the cranks.

In order to guide these stirrups, I provide an arm, $l$, extending up from each, and guided at the upper end by moving in a slot in the body of the velocipede, or by an eye moving upon a stationary rod. In fig. 3 the former-named mode of construction is shown.

The steering-lever $m$ is shown as mounted on the shaft $b$ for its fulcrum, and passing up through a slot or mortise in the horse's body. In cases where a box and seat are used for the body, this slot will not be required, and the fulcrum may be formed in any desired manner.

In Figure 4, I have shown the lever $m$ as guided by the curved bars $m'$ on the body of the wagon.

From the lever $m$ the rods $n\ n'$ extend to the back axle $e$, the said rod $n$ being jointed to $m$, above the fulcrum $b$, and passing to one side of the axle, and the rod $n'$ being jointed below the fulcrum $b$, and connecting with the axle on the other side of its king-bolt $i$, so that the axle $e$ and wheels may be turned in either direction, and are entirely under control by the movement of one lever.

The handle $s$ may be provided as a fixture upon the body $c'$, in such a position that when the lever $m$ and handle $s$ are grasped and held together, the wheels $d$ will be retained in a position parallel to the wheels $a\ a$, so that the velocipede will travel in a straight line, and this handle $s$ gives the rider a hold in operating the velocipede, either when travelling in a straight line or operating the lever $m$ to turn the vehicle around.

What I claim, and desire to secure by Letters Patent, is—

The lever $m$, with the rods $n\ n'$ connected, respectively, above and below the fulcrum, in combination with the wheels $d\ d$ and axle $e$, to which the other ends of the rods $n\ n'$ are connected on opposite sides of the king-bolt $i$, so as to steer the velocipede by the movement of one lever, as set forth.

HARVEY A. REYNOLDS.

Witnesses:
 CHAS. H. SMITH,
 GEO. D. WALKER.